United States Patent [19]

Stehle et al.

[11] Patent Number: 4,760,925
[45] Date of Patent: Aug. 2, 1988

[54] REFUSE SORTING APPARATUS

[75] Inventors: Wolfgang Stehle, Schlier; Dieter Fuchs, Waldburg, both of Fed. Rep. of Germany

[73] Assignee: Maschinenfabrik Bezner GmbH & Co. KG, Ravensburg, Fed. Rep. of Germany

[21] Appl. No.: 796,576
[22] PCT Filed: Feb. 27, 1985
[86] PCT No.: PCT/DE85/00060
  § 371 Date: Oct. 23, 1985
  § 102(e) Date: Oct. 23, 1985
[87] PCT Pub. No.: WO85/03890
  PCT Pub. Date: Sep. 12, 1985

[30] Foreign Application Priority Data

Mar. 1, 1984 [EP] European Pat. Off. ........... 84102186
Mar. 1, 1984 [DE] Fed. Rep. of Germany ....... 3407611
Apr. 21, 1984 [DE] Fed. Rep. of Germany ....... 3415090

[51] Int. Cl.⁴ ........................ B07B 13/00; B07B 15/00
[52] U.S. Cl. .................................... 209/616; 209/635;
  209/642; 209/645; 209/692; 209/707; 209/930
[58] Field of Search ............... 209/615, 616, 635, 631,
  209/642, 645, 656, 691, 692, 693, 694, 696, 700,
  707, 920, 930; 198/692, 693, 817

[56] References Cited

U.S. PATENT DOCUMENTS

| 448,394 | 3/1891 | Wheelan | 209/692 |
| 906,168 | 12/1908 | Shumaker | 209/692 |
| 1,320,169 | 10/1919 | Payne | 209/692 |
| 2,008,122 | 7/1935 | Ayres | 209/692 |
| 2,114,263 | 4/1938 | Heaslet | 209/642 |
| 2,116,006 | 5/1938 | Thys | 209/616 |

FOREIGN PATENT DOCUMENTS

| 1110996 | 10/1981 | Canada . |
| 0123825 | 11/1984 | European Pat. Off. . |
| 182993 | 8/1904 | Fed. Rep. of Germany . |
| 804191 | 4/1951 | Fed. Rep. of Germany . |
| 1094515 | 12/1960 | Fed. Rep. of Germany ...... 209/692 |
| 2253353 | 7/1974 | Fed. Rep. of Germany . |
| 948000 | 7/1949 | France | 209/692 |
| 2481617 | 11/1981 | France . |
| 566183 | 12/1944 | United Kingdom . |
| 625605 | 6/1949 | United Kingdom ................ 209/692 |
| 824414 | 12/1959 | United Kingdom . |
| 2070978 | 9/1981 | United Kingdom . |
| 737027 | 3/1981 | U.S.S.R. . |

OTHER PUBLICATIONS

The National Institute of Agricultural Engineering; Agricultural Engineering Record", "Separation of Stones from Potatoes", vol. 2, Autumn, 1947–Summer, 1949, p. 40.

Primary Examiner—Robert B. Reeves
Assistant Examiner—Donald T. Hajec
Attorney, Agent, or Firm—Spencer & Frank

[57] ABSTRACT

A sorting installation for separating a first type of articles (relatively light and substantially two-dimensional) from a second type of articles (relatively heavy and substantially three-dimensional), includes a travelling conveyor belt having an article-supporting surface receiving the first and second type of articles in a generally mixed state. The article-supporting surface is arranged for travel in its length dimension and is inclined to the horizontal in its width dimension for causing primarily the second type of articles to move by gravity downwardly and laterally off the article-supporting surface. The article-supporting surface slopes upwardly as viewed in a direction of travel. There is further provided a vibrator connected to the belt conveyor for enhancing movement by gravity of the second type of articles on the article-supporting surface. The installation also has a catch curtain suspended above the article-supporting surface and arranged to deflect articles of the first type for eventual entrainment by the conveyor belt and to allow articles of the second type to pass through for continuing their movement by gravity on the article-supporting surface. The catch curtain is oriented at an oblique angle to the travelling direction of the conveyor belt and extends effectively uninterruptedly substantially along the entire length dimension of the article-supporting surface.

14 Claims, 5 Drawing Sheets

REFUSE SORTING APPARATUS

CROSS-REFERENCE TO RELATED APPLICATION

This application contains subject matter related to application Ser. No. 06/807,781 filed Dec. 11th, 1985.

The invention relates to a sorting apparatus, particularly for segregating valuable materials from domestic garbage, industrial garbage, bulky garbage, dry garbage, and/or problematic and dangerous materials.

Such apparatuses and installations have already been proposed, in German Offenlegungsschrift No. 3,145,090 for example.

Reference is expressly made to the contents of this previously published application.

The underlying aim of the invention is to produce a complete sorting installation with individual sorting apparatuses for materials of the type mentioned initially, which are capable of flexible use, exhibiting low production costs and operating costs, and are robust in operation. It is further proposed to avoid the disadvantages of the prior art. It is a further aim to conform specific components of the installation in such a way that they are useful for sorting even when detached from the remainder of the installation.

This aim is achieved by the features of the independent claims.

The invention starts from the discovery that the disadvantages which occur in the prior art can be overcome only by an extremely flexible system of sorting the valuable materials. At the same time, minimum capital costs and the smallest possible personnel requirement should be sought. The installation according to the invention has, particularly, the advantage that a very wide range of quantities can be processed and a very wide variety of sorting functions can be performed. Due to the revolving sorting table, unsorted material passess repeatedly to a next, or finally to the same, sorting station in order to be segregated ultimately. The residual fraction is discharged selectively between the sorting stations, at the start or at the end of the sorting path.

According to the invention a sorting machine is provided which achieves a segregation of the two-dimensional parts from the three-dimensional parts by a combined belt system. A separation of the heavy three-dimensional parts from two-dimensional parts is achieved by the static friction of the inclined belt and by a catch curtain to restrain the light two-dimensional parts, by the trampoline effect on impact and by the vibratory movement of the vibratory device, and also by gravity. The fractions separated in this way are fed to the two concentrically oriented rings of the sorting table.

Advantageously, a brush wheel is further arranged at the end of the sorting machine, the soft bristles of which throw lighter parts such as paper, plastics or the like, away tangentially, whereas heavier parts such as glass bottles remain largely uninfluenced.

In the case of minor sorting functions, this sorting machine may also be used independently of the remainder of the installation.

An alternative solution according to the invention provides that an additional sorting machine is provided for the mechanical sorting of textiles, bands, strings, stockings, foil strips or the like. Any disadvantageous clogging of following devices can be avoided by this means.

As a further supplementation of the sorting installation, a valuable substance sorting machine is provided which separates mixed paper in advantageous manner, that is to say performs a separation of heavier two-dimensional paper material from lighter three-dimensional or crumpled-paper material or the like.

Advantageous apparatuses and machines of the sorting installation, according to the invention, are illustrated in the drawings and described more fully in the following description. In the drawing:

FIG. 4 shows a plan of the machine according to FIG. 3, FIGS. 5 and 6 show a further sorting machine for sorting textiles, strings, bands or the like, FIGS. 7 and 8 show a further sorting machine for separating mixed paper.

Figure 1:
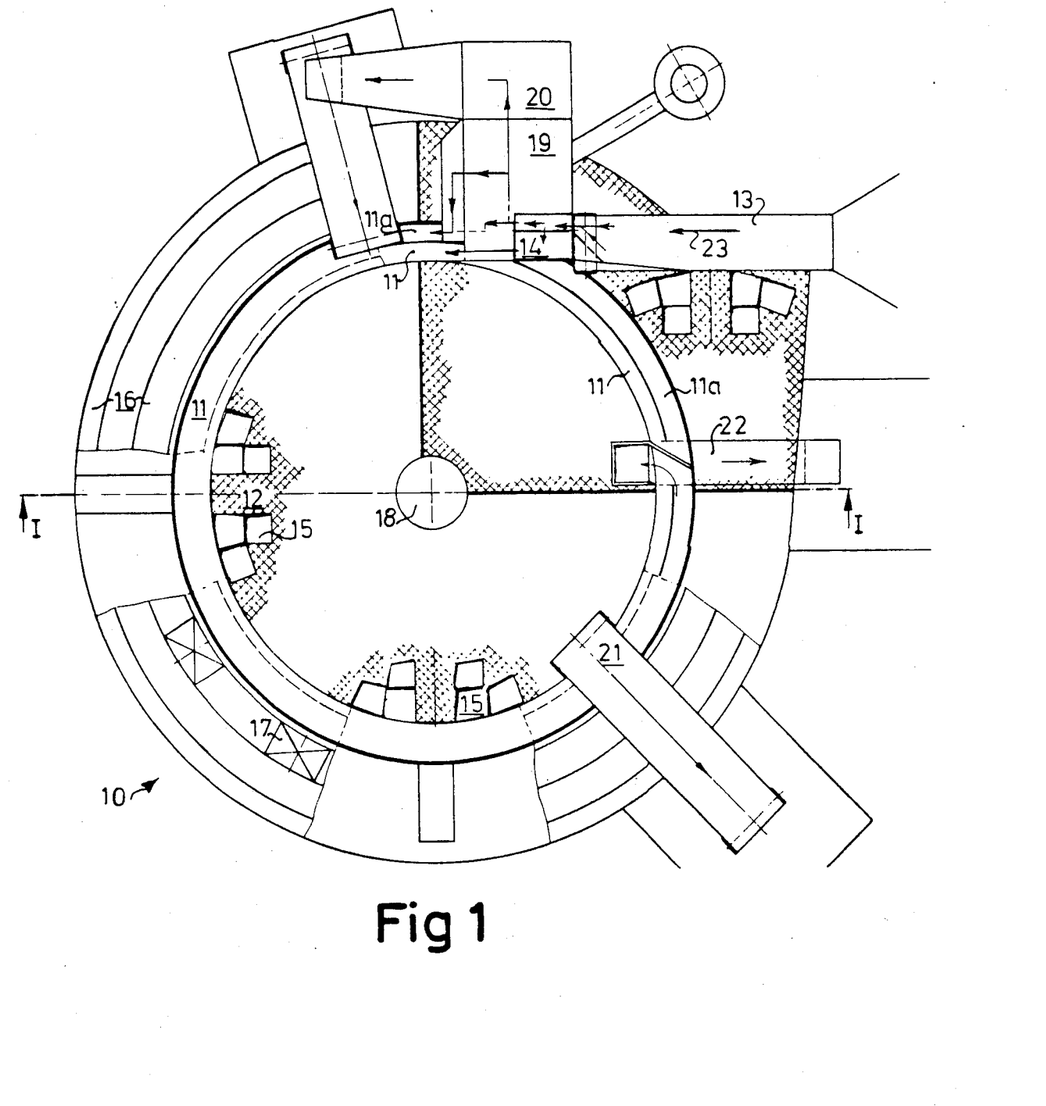
FIG. 1 shows the plan of a known apparatus with corresponding sections to illustrate the plane located beneath it, FIG. 2.shows a section along the line I—I in FIG. 1.
Figure 2:
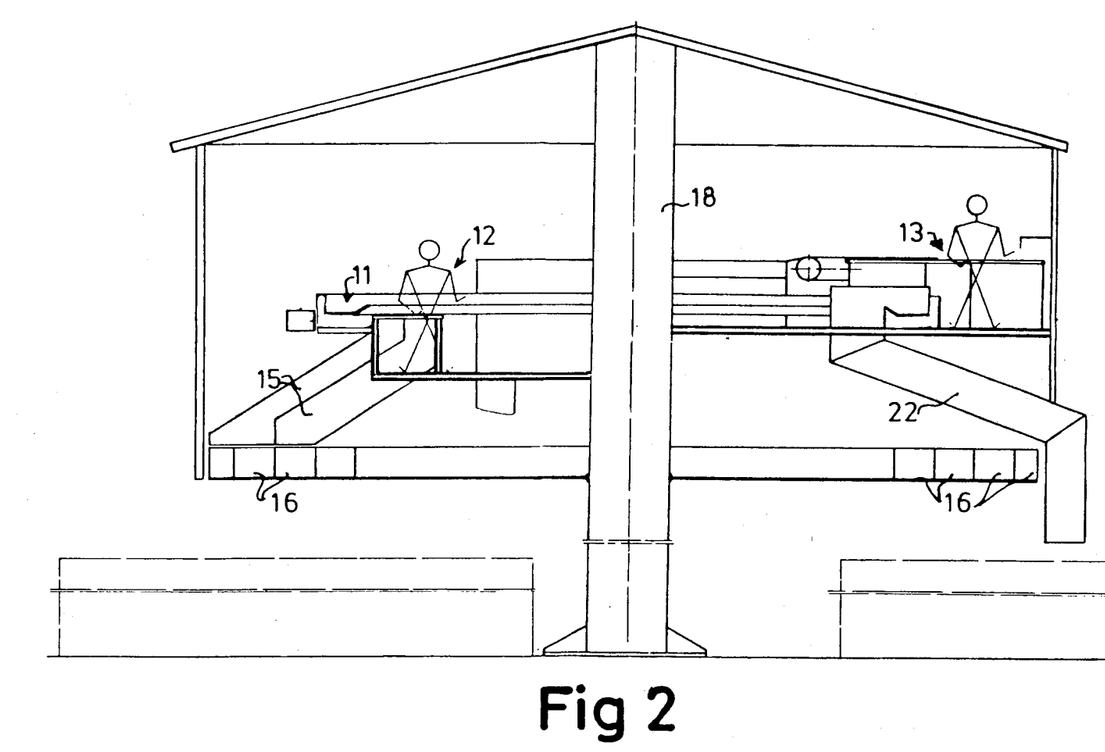

The known sorting installation 10 illustrated in FIGS. 1 and 2 is utilised in the system according to the invention and consists of an annular plane horizontally revolving sorting table 11, which is divided into two concentric annuli 11, 11a revolving in the same or in opposite directions, the speeds of revolution of which are infinitely variable. A plurality of identical sorting benches 12, which may be constructed as manual or automatic picking stations, are associated with the sorting table 11 inside and outside the annulus. The sorting benches are of circular segment-shaped construction and are mounted fixed or rotatably, so that, when controlled by a pedal switch, they can follow the travelling sorting table. Each sorting bench can accommodate a plurality of sorters, four for example, in order to perform the required work load. The sorting table 11 is preceded by a preliminary sorting path 13, on which large cardboard articles are gripped by a manually-guided suction lifter, for example, and fed directly to a separate conveyor belt or to a container. By this measure the sorting table 11 need not be constructed for the size of such large articles.

Each sorting bench 12 according to FIG. 1 is equipped with sorting shafts 15, which lead to disposal ducts 16 which are arranged parallel, or on conceptric tracks, below the sorting table. The disposal ducts 16 have, at one or more points, passage apertures 17 through which the valuable material collected in the disposal ducts is discharged. Containers or conveyor belts, which convey the sorted valuable materials away from the sorting installation, may stand beneath the passage apertures 17. However, the sorting shafts may also be connected to straight or curved disposal ducts, or directly to containers.

The general function of the sorting installation according to FIGS. 1 and 2 is described in detail in German Offenlegungsschrift No. 3,415,090, to which reference is expressly made.

According to the invention, a sorting machine 14 provided additionally between the preliminary sorting path 13 and the sorting table 11 is present to separate three-dimensional from two-dimensional parts; it is constructed as an independent subassembly and described more fully below (see FIGS. 3 and 4). From the preliminary sorting path 13, the incoming valuable materials are directed onto the sorting machine 14 or onto the revolving sorting table 11. According to the invention this sorting machine 14 is followed by further sorting apparatuses 34 (FIGS. 5, 6) and/or 50 (FIGS. 7, 8), which are likewise explained more fully below.

Consequently an extension to the installation is possible without difficulty, by supplementing the sorting installation 10 by a number of "sorting machines" with special functions, as is described below. If these sorting machines are further connected to an intermediate storage path, then further advantages of the system result thereby. On the one hand, it can be achieved by the intermediate store that the various assortments of valuable materials, which arrive in batches, can be fed uniformly distributed to a sorting machine or manual picking path designed for the statistical incidence of the particular assortment. On the other hand, the possibility exists to store special sorting functions. These sorting functions can then be performed in a separate work process after the feed of valuable materials has been stopped.

Figure 3:
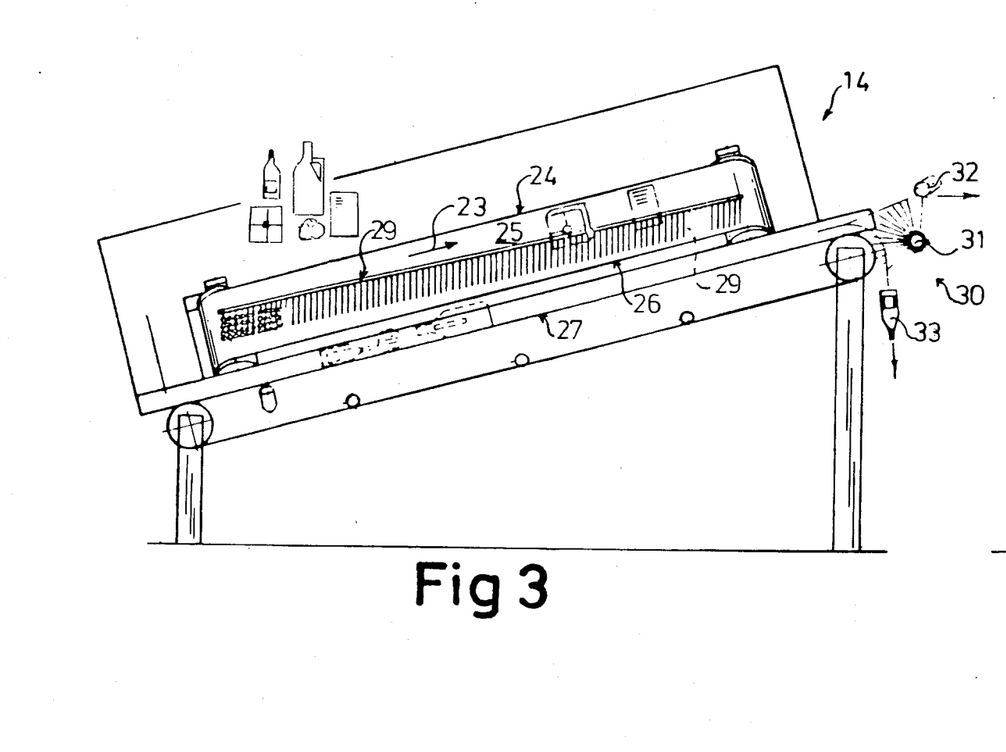
FIG. 3 shows a side elevation of a sorting machine according to the invention for separating three-dimensional parts from two-dimensional parts.
Figure 4:
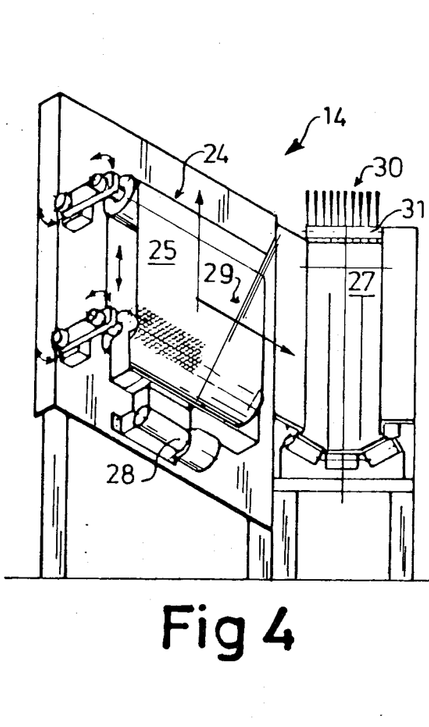

An example of construction of a sorting machine 14 according to the invention, which is illustrated in FIGS. 3 and 4, is conveniently arranged between the preliminary sorting path 13 and the sorting table 11, but may also be used alone. The incoming mixture of valuable materials is then divided into different fractions, particularly into two-dimensional light parts and three-dimensional parts, because the subsequent sorting operations can be made a function of dimensions better by this means. The sorting machine 14 consists initially of a wide-dimension conveyor belt 24 rising in the transport direction 23 with a transport plane 25 inclined relative to a horizontal plane. By means of a vibrator device 28, this inclined and rising conveyor belt 24 is set in slight oscillatory movements. The actual conveyor belt 24 has a high friction coefficient, with the result that light or two-dimensional parts (paper for example) adhere to it and are conveyed in a transport direction 23, remaining on the belt 24. Three-dimensional or heavy parts such as bottles or the like on the other hand, roll or slide away on the slope and are collected in a plane or troughed conveyor belt 27, rising in the transport direction, located therebeneath, and transported onwards.

A catch curtain 29 in the form of a chain curtain, which likewise restrains the lighter parts whereas heavy parts can slip through, is provided obliquely to the longitudinal edge of the conveyor belt 24 in its region facing the transport belt 27. The inclined arrangement, relative to the conveyor belt 24, of the chain curtain 29 causes the latter to clog less readily. The mixture of valuable materials is transferred to the preliminary sorting path 14 at the start of the belt. The materials become segregated by the impact on dropping (trampoline effect) and also by the slight oscillatory movement of the separator belt 24. The oscillatory movement of the conveyor belt imparts a recoil action to the three-dimensional parts, which favors the separation effect. Accordingly the static friction and the trampoline effect of the separator belt 24, the vibration of the vibratory device 28 and gravity cooperate in the sorting machine. A systematic preliminary sorting is thereby possible.

The conveyor belts 24 and 27 may advantageously also consist of a single, appropriately shaped belt. The conveyor belt 27 may selectively be of trough-shaped construction.

According to the invention a further separating device for parts, in the form of a brush wheel 30, is provided at the end of the lower conveyor belt 27 (selectively also at the upper belt 24). The rotation device illustrated with horizontal axis of rotation 31 in FIG. 3 grips the light parts 32 with its soft bristles and throws them away tangentially, whereas the heavy parts 33, uninfluenced, fall downwards. The brush wheel is constructed similarly to a washing brush in a motor vehicle washing installation.

The sorting machine 14 separates the mixture of valuable substances substantially into paper and bottles or the like. These fractions are then fed to the two annuli of the sorting table.

The sorting machine 14 can also be used independently for minor sorting functions. The protection is accordingly also directed to the independent use.

In the case of the sorting machine described in FIGS. 3 and 4, predominantly two-dimensional lighter parts are separated on the conveyor belt 24, from three-dimensional parts on the conveyor belt 27. The principle is based on the fact that due to the inclined position of the transport apparatus 24—this is not to be understood to mean the rise of the transport apparatus—the mixture of valuable materials charged slips downwards by gravity towards the transport apparatus 27. Parts which remain adhering on the transport plane 25 are therefore drawn laterally out of the stream of material influenced by gravity.

Figure 5:
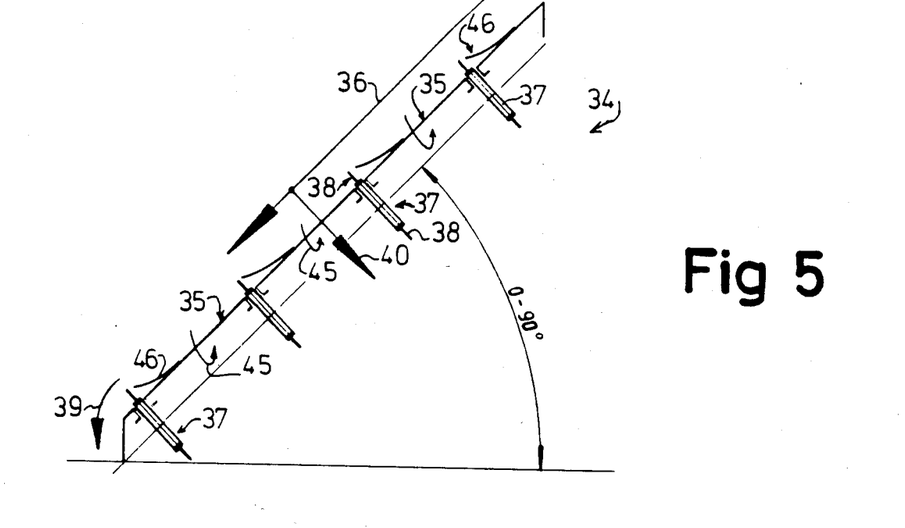
Figure 6:
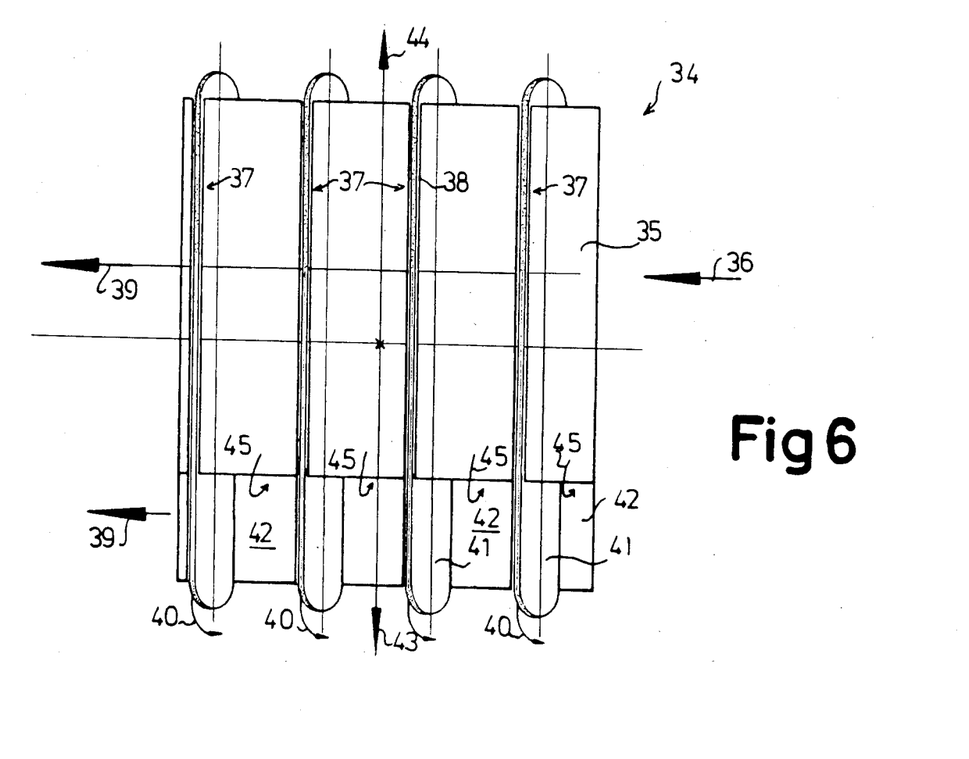

According to a further sorting machine according to the invention, illustrated in FIGS. 5 and 6, a sorting machine, optionally operated on the same principle and according to FIGS. 3 and 4, is to be conformed so that, particularly, a mechanical sorting out of textiles, bands, string, stockings, foil strips or the like, from the unsorted mixture of valuable materials is made possible. This is of great importance because, in the case of an after-sorting by screening machines for example, these valuable substances would lead to clogging there. Moreover, these materials require a particularly high manual sorting outlay.

For this purpose the sorting machine 34 illustrated in FIGS. 5 and 6 operates identically in principle to the sorting machine 14 illustrated in FIGS. 3 and 4, that is to say the material to be sorted is discharged laterally, or at any desired angles to be respectively optimised, to the main conveying stream by an appropriate conveying means from the stream of material flowing preferably by gravity. The transport plane may then be subjected to an optionally superimposed movement that is to say two-dimensional screen movement, vibration or the like, however this is not absolutely necessary.

As illustrated in FIG. 5 (end elevation) and 6 (plan), the mixture of valuable materials is charged onto the inclined transport plane 35 of the sorting apparatus 34, the inclination of which may lie between an angle 0° and 90°, preferably 30° to 60°, to the horizontal. The main transport direction due to gravity is designated by the arrow 36. At right angles or at an angle to this transport device 36, this special sorting apparatus 34 exhibits according to the invention additional conveying means 37 which, as illustrated in the drawing, are constructed for example as four revolving roller chains with pins 38 protruding into the inclined transport plane 35. However, instead of a roller chain it is also possible to use a revolving saw blade, the teeth of which likewise protrude into the transport plane. Lastly, a revolving conveyor belt with high friction coefficient or similar could also be used additionally between the roller chains or alternatively. Materials such as textiles, bands, string, stockings or the like are gripped reliably by the pins 38 or friction means protruding into the transport plane and discharged out of the transport apparatus 36 as a separate fraction 40. The fractions are designated 39 and 40 in FIG. 6, the fraction 39 being formed by the stream of valuable materials transported by gravity, and the fraction 40 by the stream of valuable materials (bands, strings or the like) discharged by means of the conveying means 27.

The end 41 of the conveying means 37 projects in sword shape beyond the end of the inclined transport plane 35. Beneath this a further transport apparatus 42 is arranged, in the form of an inclined chute for example, into which coarser parts fall which belong to the fraction 39, or which have been entrained by the valuable materials transported by means of the conveying means 37. Restraining of these materials can be achieved optionally by a curtain similar to that in FIG. 3. The valuable materials which pass into the transport apparatus 42 may be combined with the fraction 39. However, similarly to the function of the sorting machine 14 according to FIGS. 3 and 4, a third fraction 45 with lighter two-dimensional substances may be discharged through the duct 42, whereas the fraction 39 contains the heavier and/or three-dimensional materials. It is furthermore possible to combine the machines according to FIGS. 3 and 4 and to FIGS. 5 and 6.

The valuable materials discharged laterally by the conveying means 37 are stripped off from the conveying means at the end, the protruding pins 38 sliding into a stripping grill or the like, or the pins dipping into a casing.

The transport direction of the conveying means 37 may be in both directions. This is indicated by the arrows 43 and 44. It may also, particularly, be arranged at any desired angles relative to the main stream of valuable materials 36.

Ski-jump-like deflector devices 46, which may be arranged additionally in front of the respective conveying means 37, permit easier jumping across by two-dimensional or three-dimensional parts, that is to say fraction 39, whereas parts without internal strength are gripped by the conveying means 37 (fraction 40).

Figure 7:
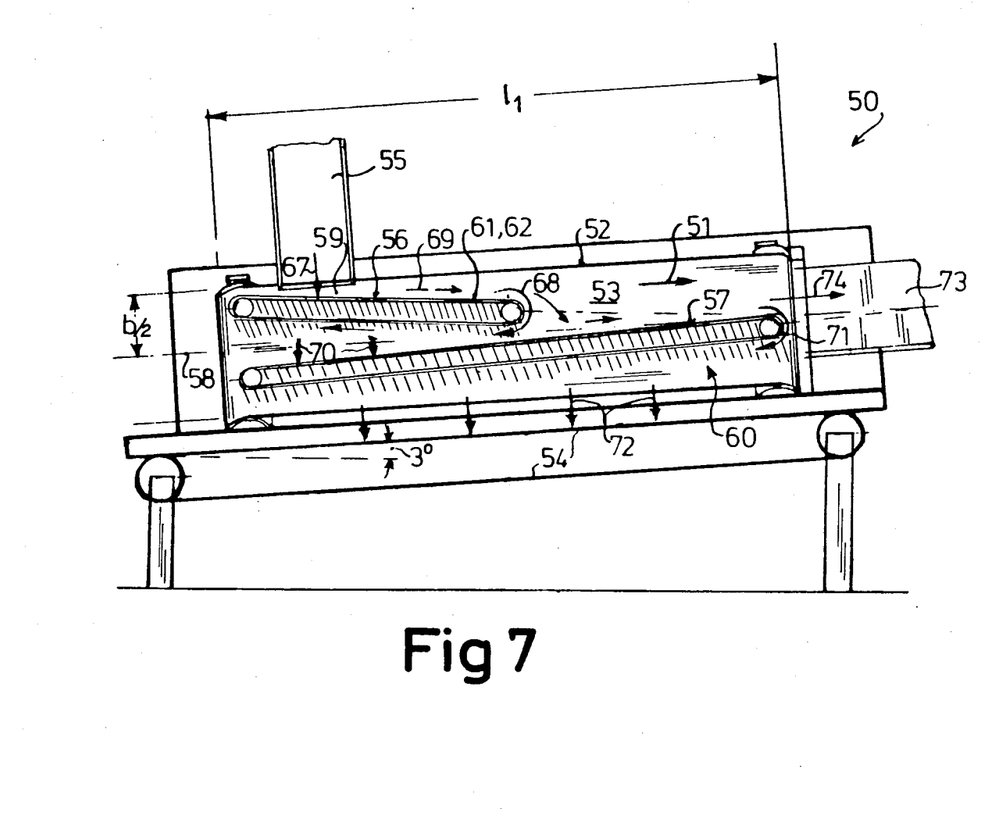
Figure 8:
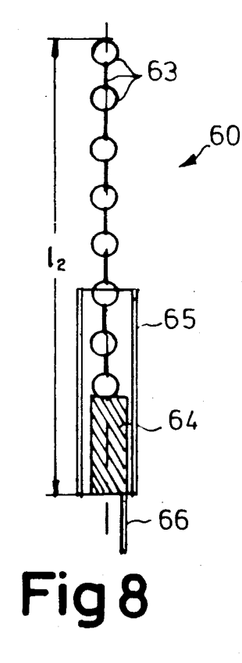

A valuable materials sorting machine according to FIGS. 7 and 8 is provided as a further development of the invention. In the case of the form of construction of a sorting apparatus according to FIGS. 3 and 4, a separation of three-dimensional heavy materials such as bottles, containers or the like, from light two-dimensional materials such as paper or the like takes place. However, according to the apparatus according to FIG. 3 it is difficult to process so-called mixed paper, that is to say heavier two-dimensional paper material such as periodicals, illustrated magazines, booklets, catalogs or the like for example from light three-dimensionally extended paper material, such as crumpled paper, plastic foils, packing paper bags or the like for example. This is the function of the apparatus according to FIG. 7.

The apparatuses according to FIGS. 3, 4 and FIG. 7 differ by their different purpose, essentially in that in the apparatus according to FIG. 7 no superimposed vibration occurs and the material charged for sorting slips down on a smooth surface due to gravity. In principle the revolving chain curtains permit a separation of the different fractions.

The arrangement of two catch curtains oriented mutually at an angle has the advantage that the material passing on to the conveying apparatus does not immediately slip down due to gravity on the transport plane with a low friction coefficient, and break through the catch curtain due to the speed of downward slip. The material to be sorted should be fed damped to the con-catch curtain due to the speed of downward slip. The material to be sorted should be fed damped to the conveying apparatus, whilst the upper catch curtain starts in the region of the charging station of the material to be sorted.

A further development of the invention which is essential to the invention provides that the catch curtains are constructed as revolving curtains. By this means the movement of the material to be sorted is supported by the conveyor belt and a rapid distribution of the material is achieved. The sorting machine according to the invention may also, in special cases, be operated with only one revolving catch curtain. The optimum result is found by experiments with different valuable materials.

The valuable materials sorting machine 50 according to FIGS. 7, 8 is described in detail below:

The valuable materials sorting machine 50 illustrated in FIG. 7 consists of a conveying apparatus 52 rising at a pitch of approximately 3° in the transport direction 51, which is constructed as a conveyor belt with low friction coefficient, for example plastic surface. The transport plane 53 of the conveying apparatus 52 is placed inclined or obliquely at approximately 40° relative to the horizontal. A further conveyor belt 54, which can receive a fraction separated by the conveying apparatus 52, may be provided parallel to the conveyor belt 52.

The conveying apparatus 52 exhibits approximately a length of $l_1$ 3 l m and b 2 m. The speed of rotation of the conveyor belt is approximately 50 rpm. The circumferential speed is approximately 0.50 m/sec.

The feeder belt 55 leads into the lower region of the slightly inclined conveyor belt 52, but in the upper region of the inclined conveyor belt. The ejection height of the paper mixture to be sorted is approximately 700 mm. The circumferential speed of the feeder belt 55 is approximately 0.80 m/sec.

According to the invention the sorting machine exhibits two chain curtains 56, 57. The shorter chain curtain 56 exhibits a length of approximately 1.5 m. The longitudinal axis of the short chain curtain 56 encloses an angle of approximately 14° with the longitudinal axis 58 of the conveying apparatus 52. The short chain curtain 56 is accordingly arranged just in front of the charging station 59 of the mixed paper to be sorted and extends obliquely towards the center line 58 of the conveying apparatus 52.

According to the invention a second longer chain curtain 57 is arranged beneath the first shorter chain curtain 56. This longer chain curtain extends from the lower lateral edge of the conveying apparatus 52, considered in the transport direction, towards the center line 58 of the conveyor belt. The long chain curtain extends along the total length of the conveyor belt 52 and commences at the start approximately at the lower lateral end and ends approximately in the region of the center line 58 of the conveyor belt. The angle enclosed with the center axis 58 is approximately 8°.

According to the invention the two chain curtains 56, 57 are constructed as revolving chain curtains. For this purpose the individual chains 60 (see FIG. 8) forming the chain curtain are attached to a revolving transport chain 61 in a chain guide rail 62. The speed of revolution of the chain curtains 56, 57 is approximately 0.5 m/sec.

A chain 60, of which the chain curtains 56, 57 are composed, is illustrated in FIG. 8. The chain 60 is hooked into the upper transport chain 61, not shown in detail in FIG. 8, which in turn travels in the chain guide rail 62. The chain 60 is formed of links 63, whilst a round steel piece 64 (25×90 mm) is provided as a weight at the lower end. The weight of the chain 60 is approximately 700 g. The lower half of the chain 60 is covered with a plastic hose 65. A rubber band 66 serves as lower extremity of the chain 60. The length $l_2$ of the chain is approximately 450 mm.

The chain guide rail 62 with the individual chains 60 hanging from the transport chain 61 is arranged above the conveyor belt 52 so that the bottom rubber band 66 (dimensions 20×4×80) of each individual chain 60 rests upon the belt 52 for approximately 10 to 20 mm.

The function of the sorting machine is explained more fully below:

The mixed paper material to be sorted consists substantially of heavy two-dimensional material such as periodicals, illustrated magazines, catalogs or the like, and of light three-dimensionally swollen paper, such as crumpled newspapers, crumpled packing paper or the like. This mixed paper is charged by the feeder belt 55 on to the conveying apparatus 52 (arrow 67), with the material dropping from a height of approximately 700 mm on to the transport plane 53. A certain separation of the different sorts of paper occurs actually as a result of this fall.

The slightly rising conveyor belt 52 with a smooth plastic surface and with a low friction coefficient moves in the direction of the arrow 51. Due to the inclined arrangement of the transport plane 53 relative to the horizontal at an angle of approximately 40°, the mixed paper charged slides on the smooth transport plane 53 against the shorter chain curtain 56, which likewise rotates in the transport direction (arrow 68). Lighter and three-dimensionally extended paper material is then transported along the shorter chain curtain 56 (arrow 69), whereas heavier two-dimensional paper material such as periodicals and catalogs slip through or beneath the short chain curtain 56 and pass along the slope of the transport plane 53 due to gravity (arrow 70) and to the lower longer chain curtain 57. The longer chain curtain 57 operates identically in principle to the shorter chain curtain 56. It likewise moves in the transport direction 51 according to the arrow 71. Heavier materials such as periodicals, catalogs slip through the longer chain curtain (arrow 72) and pass to the parallel-running conveyor belt 54 for further utilization. The lighter, three-dimensional paper material remains above the chain curtains 56, 57 and is transported onwards at the end of the sorting machine by a conveyor belt 73 (arrow 74). The heavier two-dimensional paper material can slide through beneath the chain curtains 56, 57, because the bottom boundary consists only of the flexible rubber band 66. Otherwise the heavy chain curtain restrains the lighter, three-dimensional paper material or even plastic material. Perfect separation of types of mixed paper is achieved by this means.

We claim:

1. A sorting installation for separating a first type of articles from a second type of articles fed mixed to the sorting installation; the first type of articles being relatively light and substantially two-dimensional and the second type of articles being relatively heavy and substantially three-dimensional; comprising (a) a belt conveyor including a travelling conveyor belt having an article-supporting surface receiving the first and second type of articles in a generally mixed state; said article-supporting surface having a length dimension and a width dimension perpendicular to said length dimension; said article-supporting surface being arranged for travel parallel to said length dimension and being inclined to the horizontal in a direction parallel to said width dimension for causing primarily said second type of articles to move by gravity downwardly on said article-supporting surface transversely to said length dimension and laterally off said article-supporting surface; said article-supporting surface sloping upwardly in said length dimension as viewed in a direction of said travel; wherein said article-supporting surface having a lower bordering edge extending parallel to said length dimension and being traversed by the articles of the second type upon their leaving said article-supporting surface;

(b) vibratory means operatively connected to said belt conveyor for imparting a vibration to said article-supporting surface to enhance movement by gravity of said second type of articles on said article-supporting surface;

(c) a catch curtain suspended above said article-supporting surface and arranged to deflect articles of the first type, moving by gravity on said article-supporting surface, for eventual entrainment by said conveyor belt and to allow articles of the second type to pass through for continuing their movement by gravity on said article-supporting surface; said catch curtain being oriented at an oblique angle to the travelling direction of said conveyor belt and extending effectively uninterruptedly substantially along the entire length dimension of said article-supporting surface; and an additional conveyor adjoining said bordering edge and extending therealong for receiving articles of the second type from said article-supporting surface.

2. A sorting installation as defined in claim 1, wherein said additional conveyor is trough-shaped.

3. A sorting installation as defined in claim 1, wherein said additional conveyor has a discharge end; further comprising a rotary brush wheel engaging each article at said discharge end for throwing relatively light articles in a first discharging direction and for allowing relatively heavy articles to pass through the brush wheel in a second discharging direction, whereby articles conveyed on said additional conveyor are further sorted.

4. A sorting installation as defined in claim 3, wherein said brush wheel has a horizontal axis of rotation.

5. A sorting installation as defined in claim 3, wherein said brush wheel has long, flexible bristles.

6. A sorting installation as defined in claim 1, wherein said article-supporting surface includes holding means for causing articles of the first type to be entrained by said conveyor belt in said travelling direction.

7. A sorting installation as defined in claim 6, wherein said holding means comprises a material of high coefficient of friction; said article-supporting surface being made of said material.

8. A sorting installation for separating a first type of articles from a second type of articles fed mixed to the sorting installation; the first type of articles being relatively light and substantially two-dimensional and the second type of articles being relatively heavy and substantially three-dimensional; comprising
   (a) a belt conveyor including a travelling conveyor belt having an article-supporting surface receiving the first and second type of articles in a generally mixed state; said article-supporting surface having a length dimension and a width dimension perpendicular to said length dimension; said article-supporting surface being arranged for travel parallel to said length dimension and being inclined to the horizontal in a direction parallel to said width dimension for causing primarily said second type of articles to move by gravity downwardly on said article-supporting surface transversely to said length dimension and laterally off said article-supporting surface; said article-supporting surface sloping upwardly in said length dimension as viewed in a direction of said travel; and
   (b) first and second catch curtains suspended above said article-supporting surface and arranged to deflect articles of the first type, moving by gravity on said article-supporting surface, for eventual entrainment by said conveyor belt and to allow articles of the second type to pass through for continuing their movement by gravity on said article-supporting surface; said first catch curtain being oriented at an acute angle to the travelling direction of said conveyor belt and extending along approximately one half of said length dimension; said second catch curtain being spaced from said first catch curtain in a direction parallel to said width dimension and extending along substantially the entire said length dimension; at least one of said first and second catch curtains being a revolving chain curtain assembly.

9. A sorting installation as defined in claim 8, wherein said article-supporting surface has a low friction coefficient.

10. A sorting installation as defined in claim 8, wherein said first and second catch curtains are arranged at an acute angle to one another and converge as viewed in the direction of travel.

11. A sorting installation as defined in claim 10, wherein the first and the second catch curtains define respective angles of 14° and 8° with said direction of travel.

12. A sorting installation as defined in claim 8, wherein said chain curtain assembly comprises a chain guide rail, a transport chain revolving therein and a plurality of chain lengths suspended from the transport chain.

13. A sorting installation as defined in claim 12, wherein the chain lengths have a lower end; further comprising a weight attached to the lower end.

14. A sorting installation as defined in claim 13, further comprising a vertically oriented rubber lip attached to each chain length and extending downwardly therefrom.

* * * * *